US012643804B2

(12) United States Patent
McDonough et al.

(10) Patent No.: US 12,643,804 B2
(45) Date of Patent: Jun. 2, 2026

(54) METHOD AND SYSTEM FOR FINE PARTICULATE REMOVAL AND PROCESSING FROM A COAL COMBUSTION RESIDUAL SURFACE IMPOUNDMENT

(71) Applicants: Kevin McDonough, Highland Park, IL (US); Andrew Matthews, Long Grove, IL (US); Kevin Matyas, Lindenhurst, IL (US); Jack Ma, Inverness, IL (US); Joseph Woodley, Athens, AL (US); David Donkin, New Waterford, OH (US); Andrew Gross, Gurnee, IL (US); Mark Owens, Midlothian, VA (US); Morgan French, Hoover, AL (US)

(72) Inventors: Kevin McDonough, Highland Park, IL (US); Andrew Matthews, Long Grove, IL (US); Kevin Matyas, Lindenhurst, IL (US); Jack Ma, Inverness, IL (US); Joseph Woodley, Athens, AL (US); David Donkin, New Waterford, OH (US); Andrew Gross, Gurnee, IL (US); Mark Owens, Midlothian, VA (US); Morgan French, Hoover, AL (US)

(73) Assignee: United Conveyor Corporation, Waukegan, IL (US)

( * ) Notice: Subject to any disclaimer, the term of this patent is extended or adjusted under 35 U.S.C. 154(b) by 320 days.

(21) Appl. No.: 18/136,964

(22) Filed: Apr. 20, 2023

(65) Prior Publication Data
US 2024/0351931 A1 Oct. 24, 2024

(51) Int. Cl.
*C02F 1/66* (2023.01)
*C02F 9/00* (2023.01)
(Continued)

(52) U.S. Cl.
CPC .................. *C02F 9/00* (2013.01); *C02F 1/66* (2013.01); *C02F 11/122* (2013.01);
(Continued)

(58) Field of Classification Search
CPC .. C02F 9/00; C02F 1/66; C02F 11/122; C02F 11/123; C02F 11/14; C02F 2103/10;
(Continued)

(56) References Cited

U.S. PATENT DOCUMENTS

| | | | | |
|---|---|---|---|---|
| 4,482,459 A | * | 11/1984 | Shiver | ................... B01D 36/00 210/776 |
| 2020/0269170 A1 | * | 8/2020 | Vette | ......................... B30B 9/22 |

(Continued)

FOREIGN PATENT DOCUMENTS

| | | | | | |
|---|---|---|---|---|---|
| CN | 108745623 A | * | 11/2018 | ............... | B03B 7/00 |
| CN | 110052326 A | * | 7/2019 | ............... | B03D 3/06 |

(Continued)

OTHER PUBLICATIONS

English translation of FI121299B, published Sep. 30, 2010. (Year: 2019).*

(Continued)

*Primary Examiner* — Joseph W Drodge
(74) *Attorney, Agent, or Firm* — Vitale, Vickrey, Niro, Solon & Gasey LLP

(57) ABSTRACT

A method and system for removing a slurry from a surface impoundment to create a dewatered particulate cake on a filter bed is disclosed.

10 Claims, 7 Drawing Sheets

(51) Int. Cl.

| | |
|---|---|
| *C02F 11/122* | (2019.01) |
| *C02F 11/123* | (2019.01) |
| *C02F 11/14* | (2019.01) |
| *C02F 103/10* | (2006.01) |
| *C02F 103/18* | (2006.01) |

(52) U.S. Cl.
CPC .............. *C02F 11/123* (2013.01); *C02F 11/14* (2013.01); *C02F 2103/10* (2013.01); *C02F 2103/18* (2013.01); *C02F 2303/24* (2013.01)

(58) Field of Classification Search
CPC .............. C02F 2103/18; C02F 2303/24; C02F 11/121; C02F 11/147; C02F 11/12; B07B 1/04; B07B 1/10; B07B 1/40; B07B 13/00; B07B 13/04; B07B 2230/04; B03D 1/08; B03D 1/082; B03D 3/00; B03D 3/02; B03D 3/06; B03D 2203/08

See application file for complete search history.

(56) References Cited

U.S. PATENT DOCUMENTS

| | | | | |
|---|---|---|---|---|
| 2021/0291196 A1* | 9/2021 | Vorias | .................... | B03B 9/005 |
| 2022/0081339 A1* | 3/2022 | Gannon | ............... | C02F 11/121 |

FOREIGN PATENT DOCUMENTS

| | | | | | |
|---|---|---|---|---|---|
| CN | 106999954 B | * | 4/2021 | ................ | C10L 9/00 |
| FI | 121299 B | * | 9/2010 | .............. | B03B 9/04 |
| WO | WO-2019023054 A1 | * | 1/2019 | ........... | C02F 11/148 |

OTHER PUBLICATIONS

English translation of CN108745623A, published Nov. 6, 2018. (Year: 2018).*
English translation of WO2019023054A1, published Jan. 30, 2019. (Year: 2019).*
English translation of CN_106999954_B, Apr. 27, 2021. (Year: 2021).*
English translation of CN_110052326_A, Jul. 26, 2019. (Year: 2019).*

* cited by examiner

THICKENED
SLUDGE FROM
MIX TANK

DEWATERED
SOLIDS

LIQUID FILTRATE
TO POND OR
MIX TANK

METHOD AND SYSTEM FOR FINE PARTICULATE REMOVAL AND PROCESSING FROM A COAL COMBUSTION RESIDUAL SURFACE IMPOUNDMENT

FIELD OF INVENTION

The present disclosure relates to a method and system for removing particulate from a ground impoundment for creating a dewatered cake bed composed of fine particulate for subsequent use, processing, and/or disposal. More specifically, the present disclosure includes the steps such as dredging a coal combustion residuals (CCR) impoundment slurry, scalping the resulting slurry to create fine ash and coarse ash components, placing the finer ash components into a thickener, and then taking the underflow from the thickener and placing it on a vacuum belt filter to create the fine particulate bed for subsequent use.

BACKGROUND OF THE INVENTION

Historically, the operation of coal-fired power plants entailed the maintenance of one or more ash ponds. Indeed, coal-fired power plants can have as many as eight ash ponds per power generator. The Environmental Protection Agency (EPA) has emphasized that surface impoundments cannot be closed in a way that leaves coal ash in contact with groundwater because of the health and safety risks to nearby communities. Every ash pond must follow EPA regulations, which entail lining the ash pond and eliminating leakage. Moreover, adverse ambient conditions, such as stormwater events, can frustrate the ability to keep coal ash away from groundwater.

Faced with such requirements, coal-fired power plants have the ash pond closure options of "beneficial use," "cap in place" or "closure by removal." Beneficial reuse entails recycling coal ash instead of disposing of it, such as in wallboard, concrete, roofing materials, and bricks in a way that minimizes the coal combustion residuals (CCR) from escaping into the surrounding environment. Cap-in-place leaves the coal ash in place by taking steps to prevent such ash from contaminating the surrounding environment. Surface impoundments are improved by a cover system which is placed over the residuals and by a lining system which is placed underneath the residuals. However, cap-in-place requires ongoing monitoring of nearby water sources to ensure that the groundwater remains uncontaminated. Finally, closure-by-removal transfers the coal ash away from flood zones and into a modern landfill with a protective liner. Once such CCRs have been removed, the pond site is decontaminated, and continued groundwater monitoring is not necessary.

Existing systems for CCR pond water treatment include systems such as pumping and treating free surface water on such ponds, providing deep wells or well points, and providing shallow wick points to drain ash. Such known methods, however, are unduly complex, involve methods with decreasing efficacy over time, and are of questionable performance capabilities.

What is needed is a new, consistent, simple, safe method of removing and dewatering ash for recycling pond ash and/or pond closures containing CCR.

Definition of Terms

The following terms are used in the claims of the patent as filed and are intended to have their broadest plain and ordinary meaning consistent with the requirements of the law.

A surface impoundment is any unit, whether a natural topographical depression, man-made excavation, or diked area formed primarily of earthen materials (although it may be lined with man-made materials), which is designed to hold an accumulation of liquids and particulate.

"Coal Combustion Residuals," or CCR consistent with the definition provided in 40 CFR § 257, means fly ash, bottom ash, boiler slag, and flue gas desulfurization materials generated from burning coal for the purpose of generating electricity by electric utilities and independent power producers.

A "Surface Impoundment" means a natural topographic depression, man-made excavation, or diked area, which is designed to hold an accumulation of CCR and liquids, and the unit treats, stores, or disposes of CCR.

Where alternative meanings are possible, the broadest meaning is intended. All words used in the claims set forth below are intended to be used in the normal, customary usage of grammar and the English language.

OBJECTS AND SUMMARY OF THE DISCLOSURE

The system and method of the present disclosure include dredging to provide a CCR slurry from a settling pond or similar surface impoundment. The slurry thus provided can be separated into fine or fly ash and coarse or bottom ash components. The fine components are further processed through the addition of treatment chemicals (such as a flocculant or a coagulant or both) and are input into a thickening tank. The underflow of the thickening tank is then ultimately input onto a vacuum belt filter (such as a horizontal vacuum belt filter) for further dewatering and removal.

The immediate application of the present invention will be seen in ash settling ponds, though those of skill will see that the present invention could be applied to mines tailing recovery or earth extraction processes where separation and processing of fine particulate onto a bed may be advantageous.

Thus can be seen that one object of the present invention is to provide a mechanism for remediating ash settlement ponds while controlling and processing both fine and coarse particulate.

A further object of the present invention is to provide a mechanism for efficiently dewatering and processing fine particulate from a surface impoundment for subsequent transport, disposal, or processing.

Still a further object of the present invention is to provide a combined ash removal and dewatering system.

Yet another object of the present invention is to provide a continuous operation system for ash removal and treatment.

Another object of the present invention is to provide an ash removal and treatment system and process which minimizes contact with the ash pond to a dredge.

A further object of the present invention is to provide a system and process whereby operators can verify the moisture levels on a fine particulate cake immediately after dewatering.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description of various embodiments thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
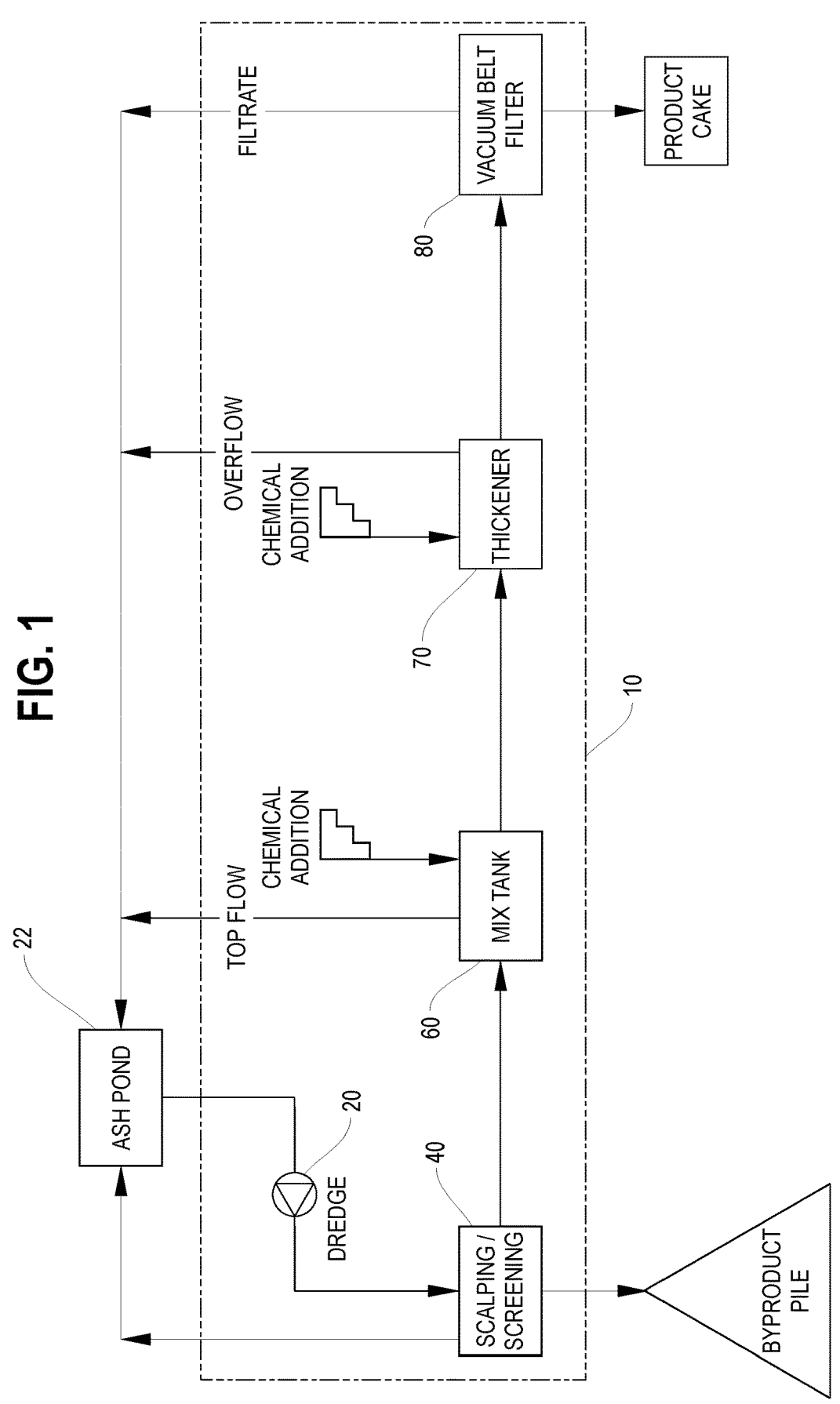
FIG. 1 shows a system according to a first preferred embodiment of the present disclosure.

FIG. 1 shows example components of a particulate removal and processing system 10, including a dredge 20, such as an electric suction dredge with necessary piping and connections to operate in a pond 22 or other similar surface impoundments, a scalper 40, such as a bucket wheel separator or stationary screen or vibrational screen or hydrocyclone which creates a byproduct pile generally larger or heavier components within pond 22, one or more mix tanks 60 optionally including inlets or input points for chemical addition and a connection to route overflow back to pond 22, a thickener or clarifier 70 such as a gravity thickener with an optional inlet or input for chemical addition and a connection to route overflow back to pond 22, and at least one horizontal vacuum belt filter 80 for creating a product cake and a connection to route filtrate therefrom back to pond 22.

Figure 2A:
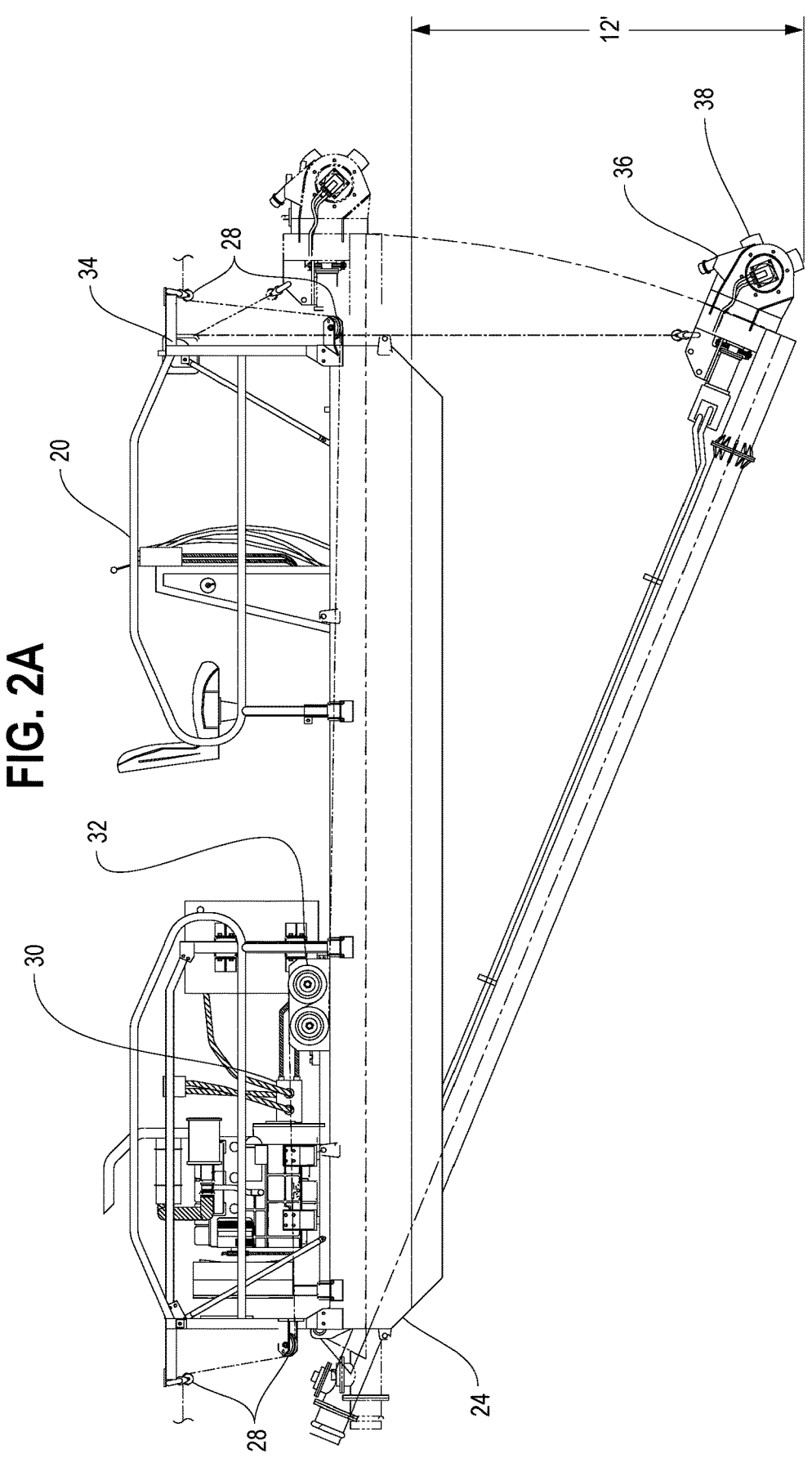
FIG. 2a shows a dredge component of a first preferred embodiment of the present disclosure.
Figure 2B:
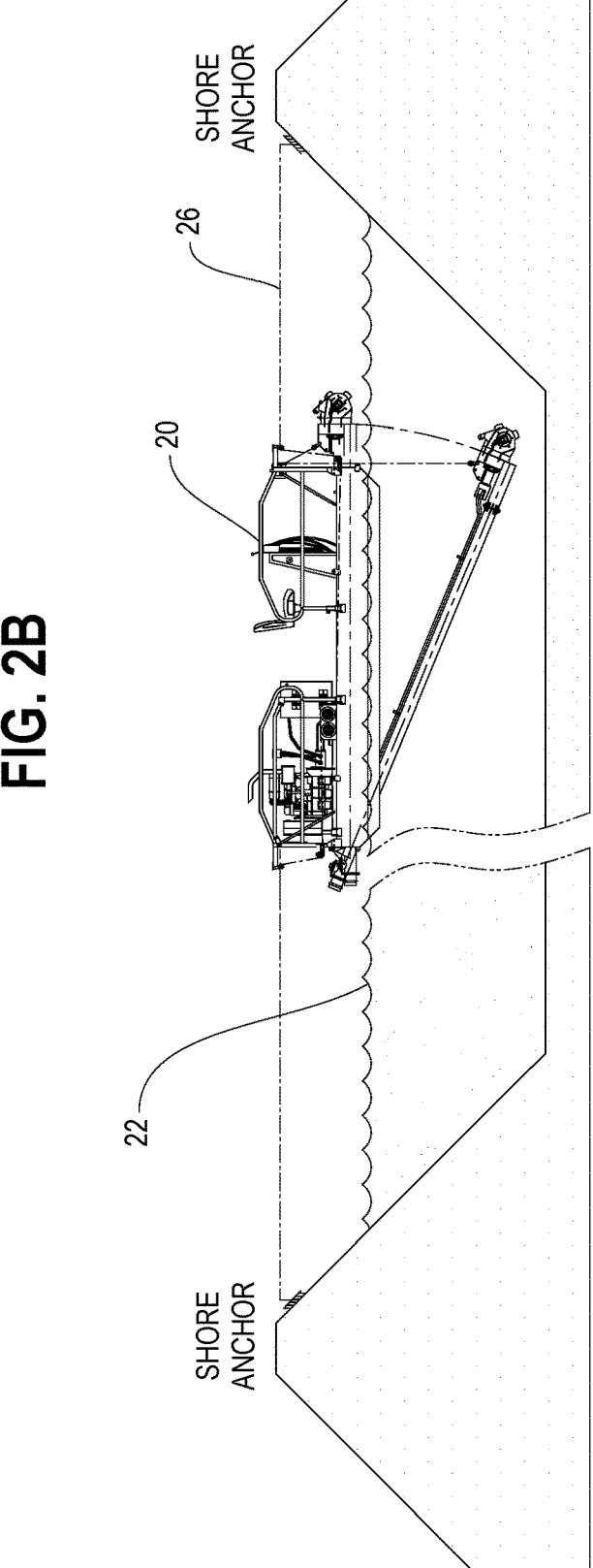
FIG. 2b shows a dredge component of a first preferred embodiment of the present disclosure in situ.

In a first preferred example, the dredge 20 as shown in FIGS. 2a-2b can comprise a lightweight portable floating dredge unit with a small footprint. In this example, the working depth of this in this example in ash ponds 22, is approximately 12 ft. The dredge 20, when used with surface impoundments such as ash ponds, can be placed on pontoons 24 that are constructed of 16-gauge stainless steel, with internal stiffening structures, compartmentalized into independent sections (not shown) and offering a 2 to 1 displacement factor for floatation. The pontoons 24 can be constructed of all welded mild steel tubing, with such tubing being powder coated for protection from the elements.

The dredge 20 can be moved around the ash pond 22 using a windlass travel system 26 comprising one or more pulleys 28, one or more motors 30, and a cable drive system 32 that moves the dredge 20 back and forth along its cable between two shore anchors. The depth control is accomplished with a hoist 34 that lifts and lowers the cutterhead and pump assembly 36 of the dredge 20. The cutterhead 36 consists of a tooth covered cutter bar 38, or a paddle assembly that rotates hydraulically to agitate material and aid in putting solids into suspension. This assembly is roughly as wide as the pontoons to provide a path for the machine to float into as material is removed from the water. The cutterhead 38 is operable in forward and reverse. The speed of rotation is variable.

Figure 3:
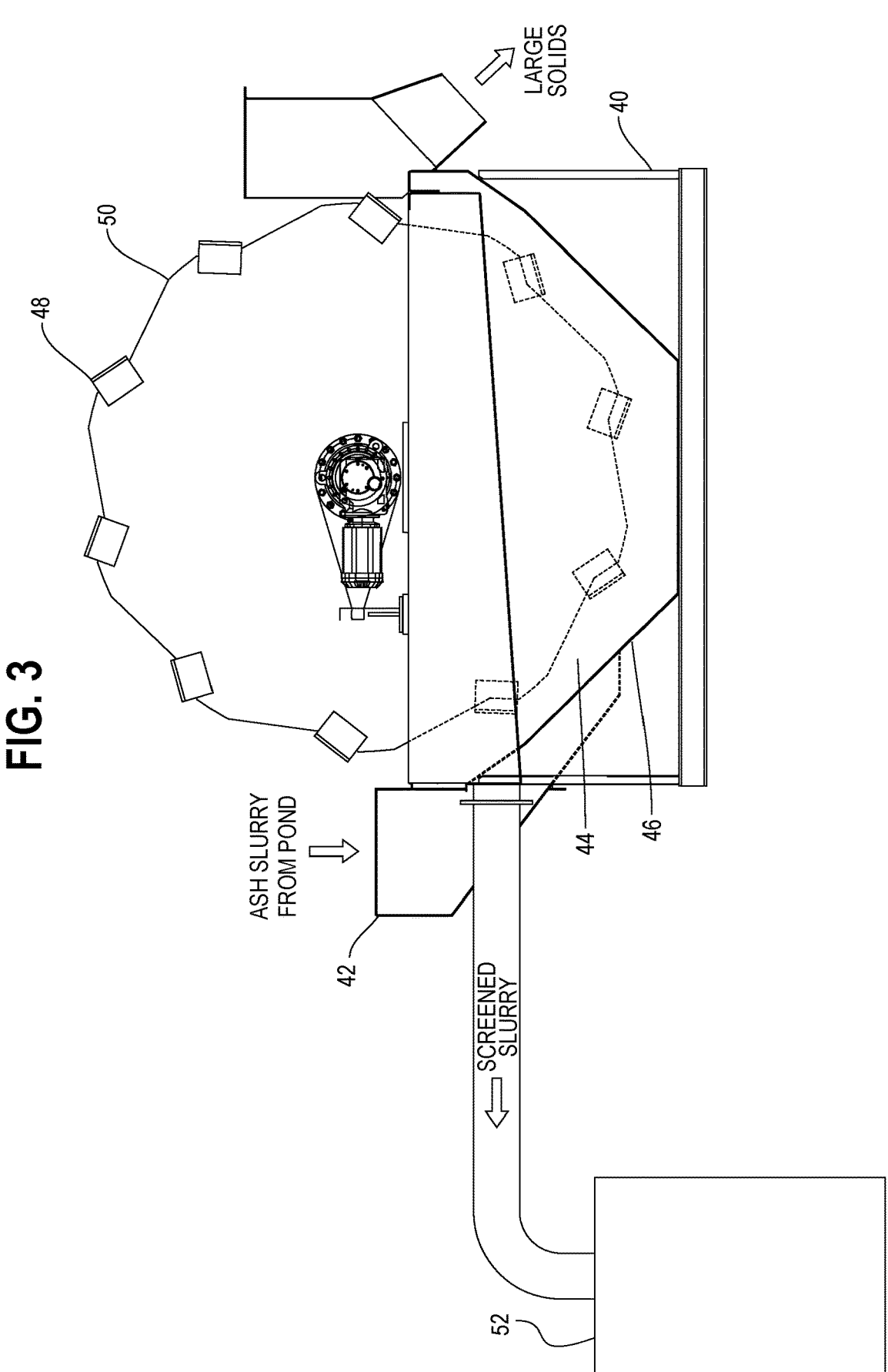
FIG. 3 shows a scalping component of a first preferred embodiment of the present disclosure.

As the dredge 20 provides an ash slurry from the pond 22, the slurry material is sent to a scalper 40, an example of which a bucket wheel separator as shown in FIG. 3 to remove larger ash solids (such as bottom ash) from the ash slurry. Such larger solids do not require further processing steps to dewater and could damage the downstream equipment described below. The ash slurry enters from the side 42 of the bucket wheel separator and slides into the basin 44 at the underside 46 of the bucket wheel 40. The bucket wheel consists of several bucket screens 48 arranged on a large wheel 50. As the wheel 50 rotates, buckets 48 scoop up the ash solids and only the larger pieces are retained. At the final point in each rotation, each bucket 48 is tipped, and the larger solids are discharged to ground in a byproduct pile where they can be picked up by separate machinery (not shown). The screened slurry overflow goes to a sump 52 where it is pumped to the next stage.

Figure 4:
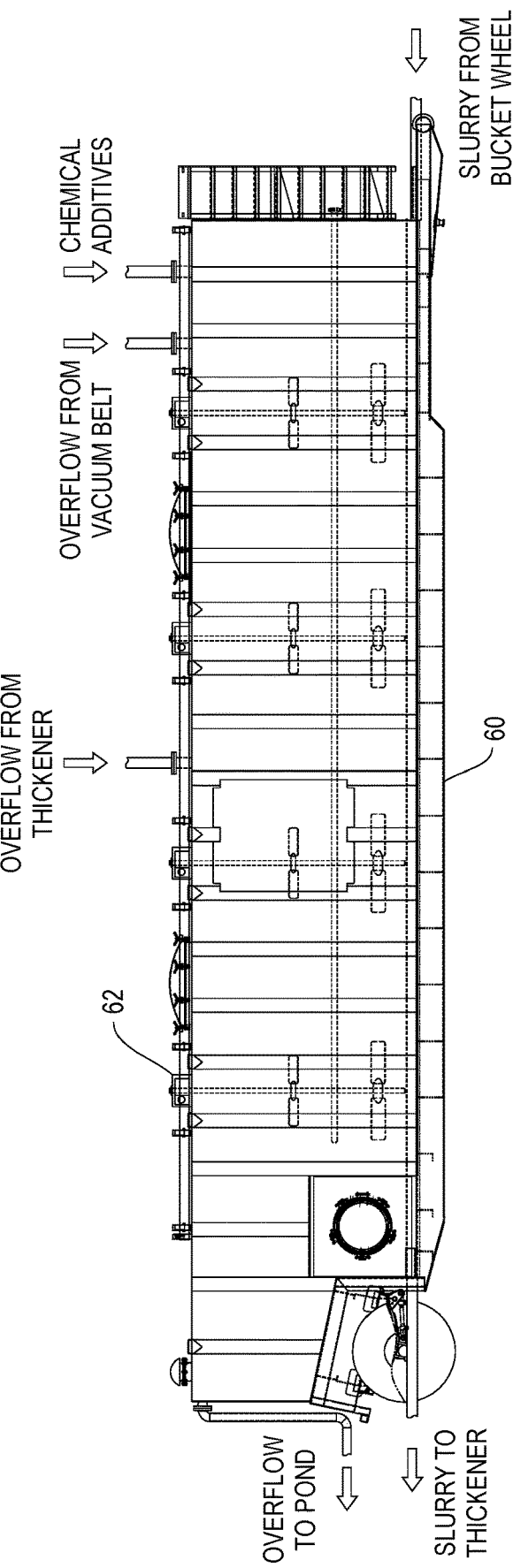
FIG. 4 shows a mix tank component of a first preferred embodiment of the present disclosure.

The screened slurry from the bucket wheel 40 comprised of a fine or fly ash particulate component is pumped to a first mix tank 60, which, as shown in FIG. 4, is essentially a frac tank modified with top mounted mixers 62. Chemical additives (such as flocculant and/or coagulant) can be added into this tank 60 to improve formation of the resulting fine particulate bed during the vacuum belt filtering process described below. Overflow from this tank 60 preferably flows back to the pond 22. Recycle streams from the thickener 70 and vacuum belt 80 can also flow to this tank 60. The influent and recycle streams as shown in this example can be controlled with a target slurry thickness of 10-15% solids. The mixed and treated slurry will then be pumped to the gravity thickener 70.

Figure 5:
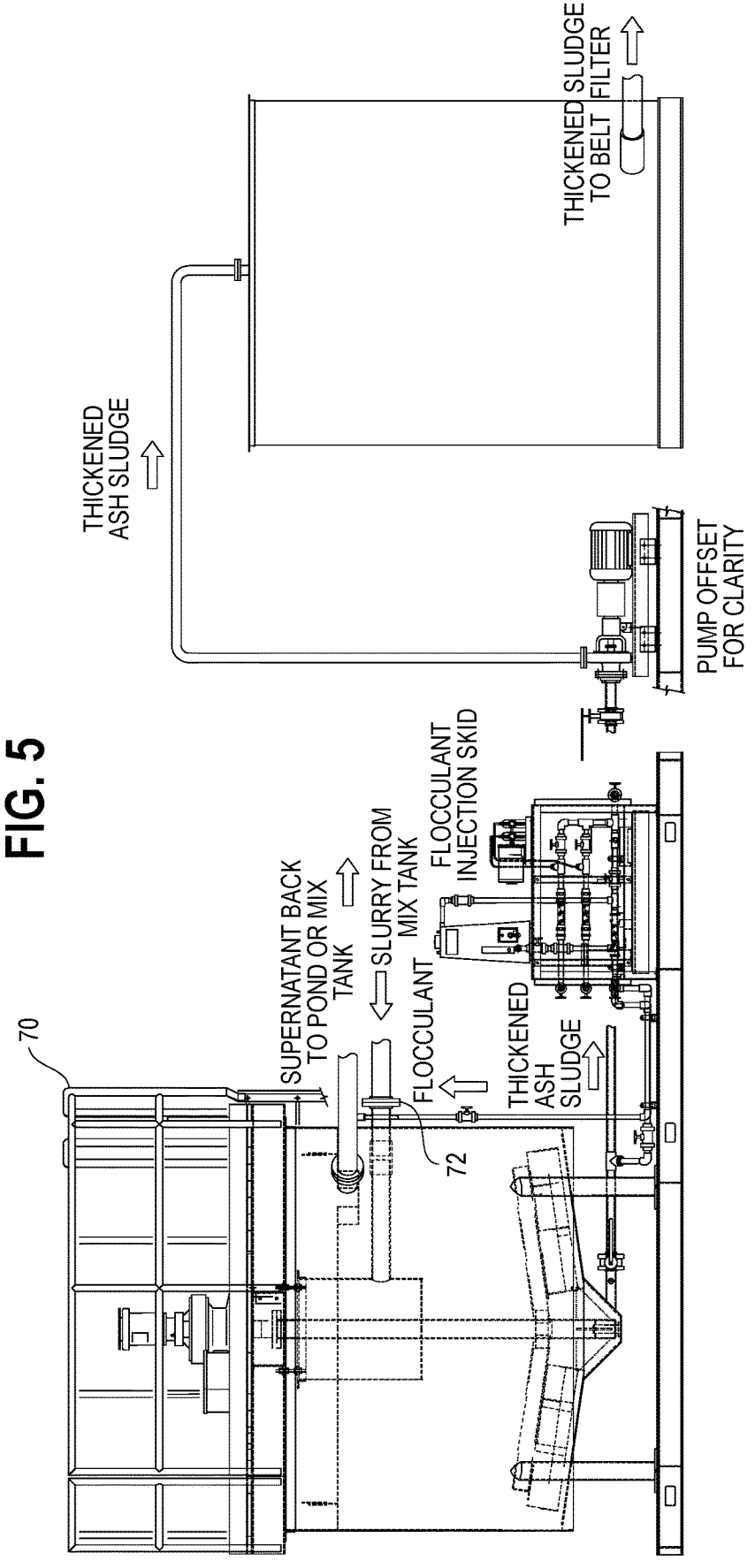
FIG. 5 shows a thickener component of a first preferred embodiment of the present disclosure.

An example of the thickener 70 is shown in FIG. 5. In this embodiment, thickener is a conventional 8' gravity thickener. The supernatant liquid from the thickening process of thickener 70 can flow back to the pond 22 but can be alternatively returned to the first mix tank 60 if necessary to maintain desired thickness. A flocculant and or a coagulant can also be fed at inlet 72 to the thickener 70. The target slurry thickness in this example for the output of this thickener 70 is 40-50% solids. The thickened ash from the bottom or underflow of this unit will be pumped to an optional second mix tank 74 as an intermediate stop prior to vacuum belt filtering to enable upfront equalization for the vacuum belt filtering step.

Figure 6:
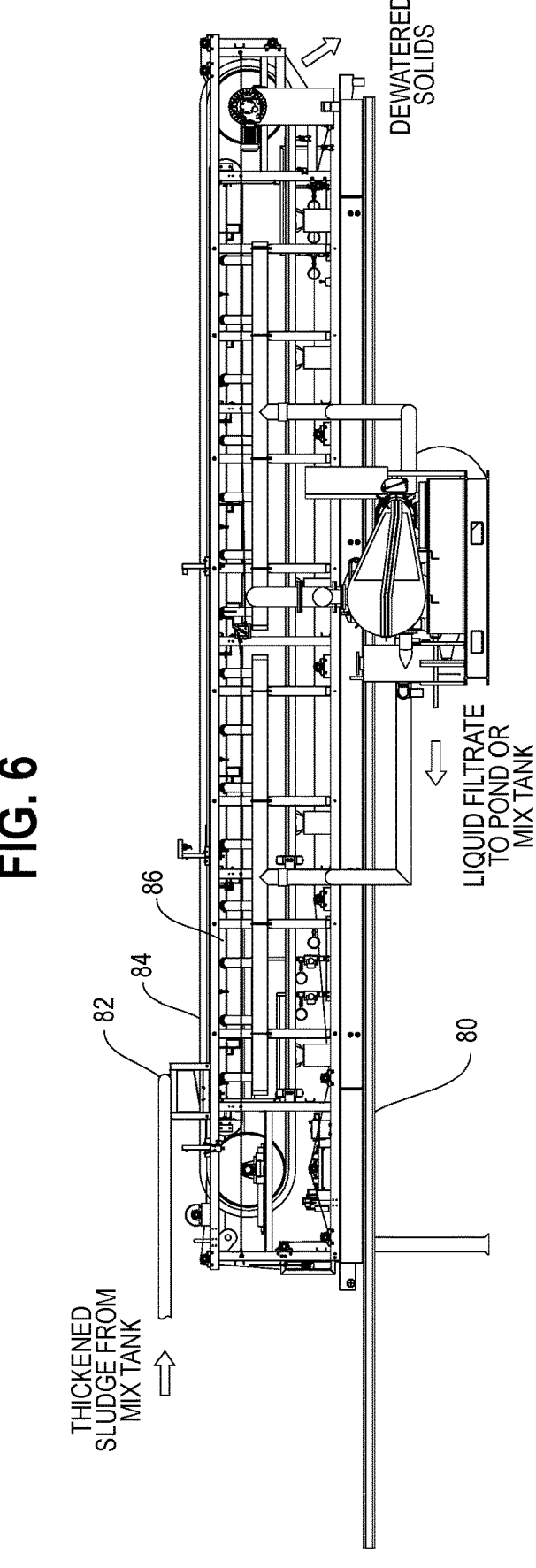
FIG. 6 shows a vacuum belt filter component of a first preferred embodiment of the present disclosure.

An example of a preferred vacuum belter filter 80 is shown in FIG. 6, specifically a horizontal vacuum belter filter. In this embodiment, the thickened sludge or underflow from the second mix tank 74 is distributed from inlet(s) 82 onto a slowly moving filter belt 84. As the belt passes over the vacuum section 86, liquid filtrate is sucked through the belt 84 and the sludge remaining on the belt 84 is dewatered to form a fine particulate bed. The liquid filtrate flowing through the belt 84 can flow back to the pond 22 but can be returned to the First Mix Tank 60 if necessary to maintain target slurry thickness. The dewatered solids fall off the end of the belt 84 as a product cake and are removed by a loader (not shown) and eventually onto transport for weighing and disposal off site. The final sludge solids content is targeted at 80% solids (20% moisture) or more.

Those of skill having the teachings of the present disclosure will understand that additional tanks, such as surge tanks and/or a day tank, be used manage capacity, to balance the flow of ash through the system, and to manage the load of the system. For instance, the optional surge tanks address this issue to compensate for inter alia, the intermittent operation of the dredge 20. Likewise, optional day tank can be used to provide a clean wash source for belt 84 and polymeric flocculant make up water.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the basic components of the system with the teachings of the present invention can be seen to have applications to non-pond surface impoundments, such as mines tailing recovery or earth extraction processes. Likewise, the references to a "thickener" in the claims should be understood to apply to various clarifiers as well as thickeners. Similarly, it will be appreciated by those skilled in the art that various changes, additions, omissions, and modifications can be made to the illustrated embodiments without departing from the spirit of the present invention. All such modifications and changes are intended to be covered by the following claims.

The invention claimed is:

1. A in situ process for remediating a coal ash pond to produce a coal combustion residual material-based cake bed, the process comprising the steps of:

a. Extracting an ash slurry from a coal ash retention pond;

b. Scalping the ash slurry to separate coarse ash components and fine ash components;

c. Placing the fine ash components in a thickener to create a thickened underflow and an overflow, the overflow being returned to the coal ash retention pond; and d. Depositing the thickened underflow upon a mechanical dewatering device including a vacuum belt filter, or belt filter press, or plate filter press to create a filtrate and a cake bed, the filtrate being returned to the thickener and the coal ash retention pond, the cake bed consisting of fine components for subsequent transport away from the coal ash pond.

2. The process of claim 1, wherein the step of placing the fine ash components in a thickener further comprises pretreating the fine ash components with chemical aids selected from a group consisting of flocculants and coagulants prior to the placement in the thickener.

3. The process of claim 2, further comprising adjusting the pH of the fine ash components prior to the placement in the thickener.

4. The process of claim 1, where the step of depositing the thickened underflow upon a mechanical dewatering device further comprises pretreating the fine ash component with chemical aids at least one of flocculants and coagulants prior to the depositing upon the mechanical dewatering device.

5. The process of claim 4, further comprising adjusting the pH of the fine ash components prior to the step of depositing the thickened underflow upon the mechanical dewatering device.

6. An in situ process for remediating a surface impoundment to produce a cake bed, the process comprising the steps of:

a. Extracting a slurry from a surface impoundment;

b. Scalping the slurry to separate coarse components and fine components;

c. Placing the fine components in a thickener to create a thickened underflow and an overflow, with overflow being returned to the surface impoundment; and d. Depositing the thickened underflow upon a mechanical dewatering device selected from the group comprising vacuum belt filter, belt filter press, and plate filter press to create a filtrate and a cake bed, the filtrate being returned the surface impoundment and the thickener, the cake bed consisting of fine components for subsequent transport away from the surface impoundment.

7. The process of claim 6, wherein the step of placing the fine in a thickener further comprises pretreating the fine components with chemical aids selected from a group consisting of flocculants and coagulants prior to the placement in the thickener.

8. The process of claim 7, further comprising adjusting the pH of the fine components prior to the placement in the thickener.

9. The process of claim 6, where the step of depositing the thickened underflow upon a mechanical dewatering device further comprises pretreating the fine component with at least one of flocculants and coagulants prior to the depositing upon the mechanical dewatering device.

10. The process of claim 9, further comprising adjusting the pH of the fine components prior to the step of depositing the thickened underflow upon the mechanical dewatering device.

* * * * *